(12) United States Patent
Brück et al.

(10) Patent No.: US 7,069,729 B2
(45) Date of Patent: Jul. 4, 2006

(54) MATERIAL FOR MAGNETIC REFRIGERATION PREPARATION AND APPLICATION

(75) Inventors: Ekkehard Hubertus Brück, Amsterdam (NL); Ojiyed Tegusi, Amsterdam (NL); Frank Roelof De Boer, Amsterdam (NL)

(73) Assignees: Stichting voor de Technische Wetenschappen, Utrecht (NL); Universiteit van Amsterdam, faculteit der Natuurwetenschappen, Amsterdam (NL)

( * ) Notice: Subject to any disclaimer, the term of this patent is extended or adjusted under 35 U.S.C. 154(b) by 195 days.

(21) Appl. No.: 10/769,658

(22) Filed: Jan. 30, 2004

(65) Prior Publication Data

US 2004/0250550 A1 Dec. 16, 2004

Related U.S. Application Data

(63) Continuation-in-part of application No. PCT/NL02/00463, filed on Jul. 12, 2002.

(30) Foreign Application Priority Data

Jul. 31, 2001 (NL) .................................. 1018668

(51) Int. Cl.
- *F25B 21/00* (2006.01)
- *C09K 5/00* (2006.01)
- *C04B 35/00* (2006.01)
- *C09D 5/23* (2006.01)

(52) U.S. Cl. ............................ 62/3.1; 62/114; 252/67; 252/62.51 R

(58) Field of Classification Search ................. 62/3.1, 62/114; 252/67, 62.51 R
See application file for complete search history.

(56) References Cited

U.S. PATENT DOCUMENTS 4,849,017 A * 7/1989 Sahashi et al. ............... 75/245
5,641,424 A * 6/1997 Ziolo et al. ................... 252/67

FOREIGN PATENT DOCUMENTS

EP 0 400 263 A 12/1990

OTHER PUBLICATIONS

Bither, T. A., et al., "New Modified Mn2 Sb Compositions Showing Exchange Inversion", Journal of Applied Physics, vol. 33, No. 3, (Mar. 3, 1962), 1346-1347.

Sato, K., et al., "Transport Properties of Mn2-x CRx SB Near Antiferro-ferrimagnetic Transition Point", Journal of Applied Physics, vol. 55, No. 6, (Mar. 15, 1984), 2036-2038.

* cited by examiner

Primary Examiner—William C. Doerrler
(74) Attorney, Agent, or Firm—Jeffrey D. Myers; Vidal A. Oaxaca; Peacock Myers, P.C.

(57) ABSTRACT

A material that can be used for magnetic refrigeration, wherein the material substantially has the general formula $(A_yB_{1-y})_{2+\delta}C_{1-x}D_x)$ wherein A is selected from Mn and Co; B is selected from Fe and Cr; C and D are different and are selected from P, As, B, Se, Ge, Si and Sb; x and y each is a number in the range 0–1; and $\delta$ is a number from (−0.1)–(+0.1).

26 Claims, 7 Drawing Sheets

MATERIAL FOR MAGNETIC REFRIGERATION PREPARATION AND APPLICATION

Figure 1:
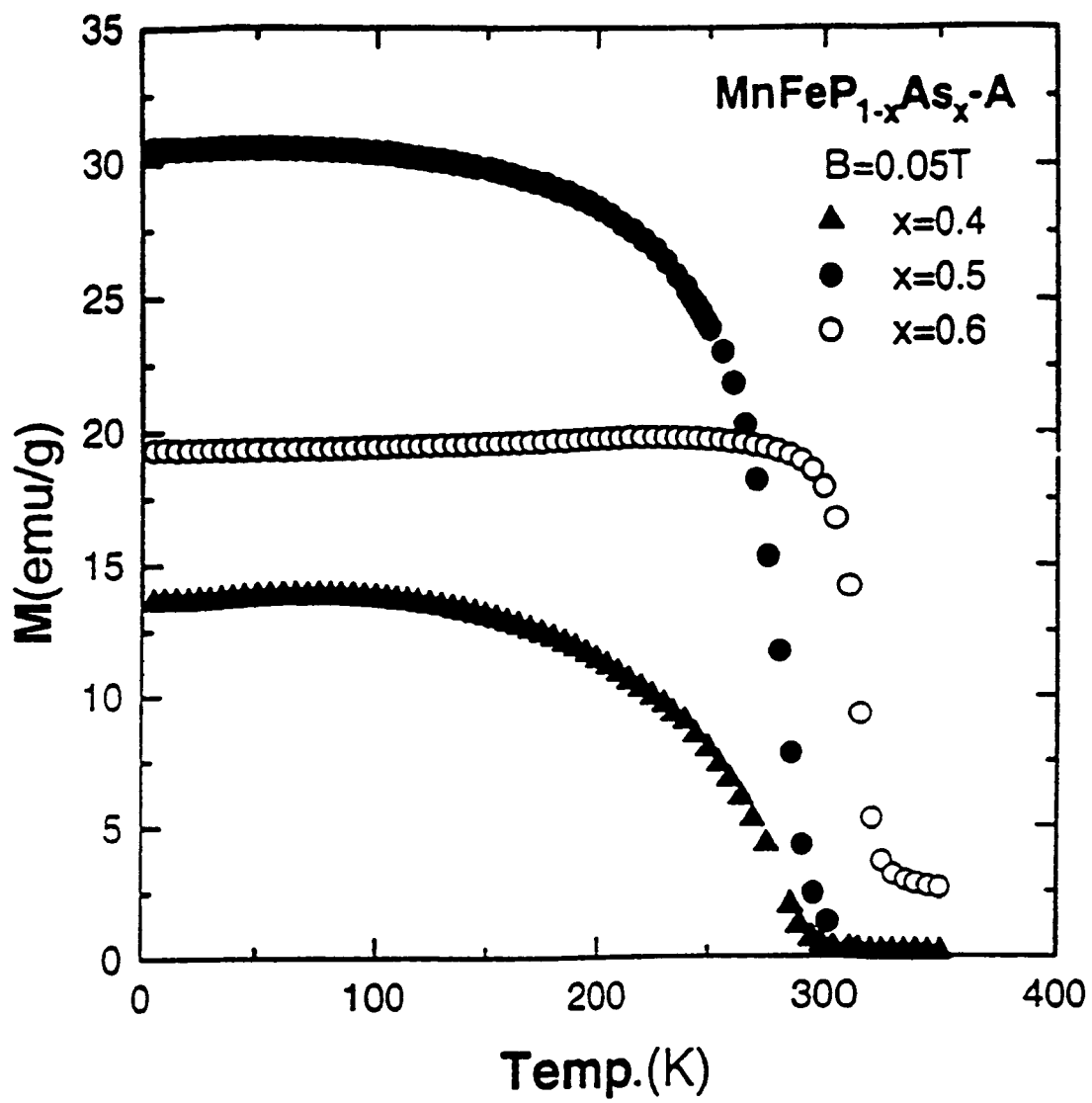

The invention relates to a material that can be used for magnetic refrigeration.

Such a material is known, for example, from the review "Recent Developments in Magnetic Refrigeration" by K. A. Gschneidner Jr. et al. in Materials Science Forum Vols. 315–317 (1999), pp. 69–76. This article reports that a search for new materials with improved magnetocaloric properties has led to the discovery of a strong magneto-caloric effect (MCE) in Gd metal and in $Gd_5(Si_xGe_{1-x})_4$ alloys, among which $Gd_5(Si_2Ge_2)$.

Such new materials make it possible to use magnetic refrigeration (MR) in refrigerated storage and refrigerated transportation of food, air conditioning in buildings and vehicles, etc.

A great advantage of magnetic refrigeration is that it is an environmentally safe technology that does not use ozone layer-depleting chemicals such as CFC's, hazardous chemicals such as $NH_3$, greenhouse gasses, etc. Moreover, because of the expected energy-efficiency, the amount of energy consumed and consequently the emission of $CO_2$ will be reduced.

A draw-back of the known materials that can be used for magnetic refrigeration is that they are not optimally applicable in the temperature range from approximately 250 to 320 K. Also, the known materials that are suitable for magnetic refrigeration such as the above-mentioned $Gd_5(Si_xGe_{1-x})_4$ alloys are very expensive, which hinders their use on a large scale.

There is a continuous need for new materials that are useful for magnetic refrigeration.

It is an object of the present invention to avoid the above-mentioned draw-back and to fill the aforementioned need.

According to the present invention, this goal is achieved with a material according to the preamble, wherein the material substantially has the general formula $$(A_yB_{1-y})_{2+\delta}(C_{1-x}D_x)$$

wherein

A is selected from Mn and Co;

B is selected from Fe and Cr;

C and D are different and are selected from P, As, B, Se, Ge, Si and Sb; and x and y each is a number in the range 0–1, and δ is a number from (−0.1) to (+0.1).

With such a composition it is possible to obtain a magnetocaloric effect that is stronger than that obtained with pure Gd. This is absolutely unexpected, because the magnetic moments of Gd-materials are by a factor of 2 greater than those of transition metal alloys, for which reason strong magnetocaloric effects are only expected in Gd-materials. The cooling capacity of the materials according to the present invention may therefore be higher than that of the best Gd-based materials referred to in the article by Gschneidner Jr. et al.. (see above). Moreover, the maximum cooling capacity covers a much more useful range of temperature with regard to the application in, for example, an air conditioner.

A further advantage of the materials according to the present invention is that they are comprised of widely occurring elements, so that large-scale application is possible.

The magnetocaloric effect is so strong that it becomes possible to work with a magnetic field generated by permanent magnets instead of (optionally superconductive) electromagnets.

A further advantage is that the materials according to the present invention do not or not readily dissolve in water.

Preferably in the material according to the present invention at least 90%, preferably at least 95% of A is Mn; at least 90%, preferably at least 95% of B is Fe; at least 90%, preferably at least 95% of C is P; and at least 90%, preferably at least 95% of D is As or Sb.

Particularly preferred is an alloy having a composition wherein a part of the As is replaced by Si and/or Ge. Especially preferable is an alloy wherein 1–40% of the As is replaced with Si and/or Ge, more preferably 10–30%, still more preferably 17–23%, and wherein most preferably 20% of the As is replaced with Si and/or Ge.

If A is Mn and B is Fe, it is further possible to replace up to 25% of the Fe with Mn, more preferably up to 15%, and most preferably to replace 10% of the Fe with Mn.

According to a further preferred embodiment, the material has the general formula $MnFe(P_{1-x}As_x)$ or $MnFe(P_{1-x}Sb_x)$ These two materials produce a high cooling capacity in the temperature range of 250 to 320 K. Of these two materials $MnFe(P_{1-x}As_x)$ is the most preferred, because of its exceptionally strong magnetocaloric effect. If there is a possibility that the compound according to the invention comes into contact with the environment, $(MnFe(P_{1-x}Sb_x)$ is preferred because, in contrast with $MnFe(P_{1-x}As_x)$, no poisonous arsenic compounds can develop during decomposition.

An even stronger magnetocaloric effect is obtained with an alloy in which a part of the As is replaced with Si and/or Ge in the above-mentioned quantities, resulting in an alloy complying with the formula $MnFe(P_{1-x}(As,Si,Ge)_x)$. Then a most preferable alloy is obtained having a composition complying with the formula $MnFe(P_{1-x}As_{0.8x}(Si/Ge)_{0.2x})$.

Favourable results are also obtained when x is a number in the range from 0.3–0.6.

Especially for $MnFe(P_{1-x}As_x)$, a suitable choice of x will allow the ferromagnetic ordering temperature at which an optimal magnetic refrigeration effect is obtained to be adjusted from 150 to 320 K. In this way favourable results are obtained with a material according to the invention, in which the material substantially has the general formula $MnFe(P_{0.45}As_{0.55}$. When, according to the preferred embodiment described above, a portion of the As is replaced with Si and/or Ge, the magnetocaloric effect is improved even further. Most preferably the alloy then has a composition having the formula 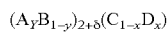 or $MnFeP_{0.45}As_{0.45}Ge_{0.10}$.

The present invention also relates to a method for the manufacture of the material having the general formula MnFe $P_{1-x}As_x)$ or MnFe $P_{1-x}Sb_x)$, wherein powders of iron arsenide $(FeAs_2)$ or iron antimony $(FeSb_2)$; manganese phosphide $(Mn_3P_2)$; iron (Fe); and manganese (Mn) are mixed, mechanically alloyed and sintered in suitable quantities to produce a powder mixture that complies with the general formula $MnFe(P_{1-x}As_x)$ or $MnFe(P_{1-x}Sb_x)$ and the powder mixture is subsequently molten under an inert atmosphere and annealed.

A particularly preferable method starts out from $Fe_2P$, $MnAs_2$, Mn and P in suitable weight proportions, these are mixed, the powder mixture is melted, and the resulting alloy is finally annealed. The starting materials may, for example, be treated in a ball mill to produce an alloy. This alloy is subsequently sintered under an inert atmosphere and then annealed, for example, in a suitable furnace. Especially an alloy of the composition $MnFeP_{0.45}As_{0.55}$, in which preferably a portion of the As is replaced with Si and/or Ge, preferably an alloy of the composition $MnFe(P_{0.45}As_{0.45}Si_{0.10}$ or the composition $MnFeP_{0.45}As_{0.45}Ge_{0.10}$, will exhibit a magnetocaloric effect at room temperature that is stronger than the one found when using pure Gd. This is contrary to the general expectation because based on the usual models, strong magnetocaloric effects are only expected in rare earth materials, as the magnetic moments in these materials are by a factor 2 or even more greater than in transition metal alloys. However, those models apply only at low temperatures. At room temperature a stronger magnetocaloric effect may occur in suitable alloys based on transition metals according to the invention.

It has been shown that if the above-mentioned materials $MnFe(P_{1-x}As_x)$ and $MnFe(P_{1-x}Sb_x)$ are prepared starting out from the pure materials As or Sb, P, Fe and Mn, and optionally Si and/or Ge, the resulting materials do indeed also exhibit a strong magnetocaloric effect but, on the other hand, also a considerable temperature hysteresis. This means that when the material has been magnetised once, it must first be further heated and cooled before the same magnetocaloric effect can be measured at the same temperature for the second time.

Prior to melting, the powder mixture is preferably first compressed into a pill. This reduces the chance of material loss when the material is being melted.

When melting the powder mixture under an inert atmosphere, it has been shown to be advantageous for this inert atmosphere to be an argon atmosphere. This reduces the occurrence of contaminants in the material during melting.

It is also preferable for the molten powder mixture to be annealed at a temperature in the 750–900° C. range, e.g. 780° C. This results in a low concentration gradient in the material.

Finally, the present invention relates to the application of the material according to the invention with magnetic refrigeration in the 250–320 K range. The material according to the present invention may be used, among other things, for food refrigerators, air conditioners, computers, etc.

The method according to the present invention will now be further elucidated with reference to a nonlimiting exemplary embodiment.

EXAMPLE 1

1.8676 g iron arsenide ($FeAs_2$) powder (AlfaAesar Research Chemicals Catalogue, 2N5 stock# 36191), 1.4262 g manganese phosphide ($Mn_3P_2$, 2N stock# 14020), 1.1250 g iron (Fe, 3N stock# 10213), and 0.5882 g manganese (Mn, 3N stock# 10236) were mixed by hand. The powder mixture was compressed to a pill and subsequently melted under argon atmosphere. The nominal composition of the pill was $Mn_{1.01}FeP_{0.43}As_{0.62}$. Subsequently, the molten pill was annealed for 3 days at 780° C. After melting, the pill weighed 4.639 g, which means that 0.41 g was lost due to the material splashing and vaporising during melting. Microprobe analysis of the material showed that minor concentration gradients occurred in the material which, however, appeared to have no negative effect on the magnetocaloric effect. Lower concentration gradients may be obtained by annealing at a slightly higher temperature, such as 850° C.

Of the above prepared materials (with the general formula $MnFe(P_{1-x}As_x)$, wherein x substantially is approximately 0.6) and of the materials prepared analogous to the method 1 mentioned above, wherein x substantially is between 0.4 and 0.5, respectively, the temperature-dependence of the magnetisation, the magnetocaloric effect $\Delta S_m$ and the cooling capacity were determined. The cooling capacity was compared with that of the materials Gd and $Gd_5(Si_2Ge_2)$ described in the article by Gschneidner Jr. et al. (see above).

FIG. 1 shows the temperature-dependence of the magnetisation ("M" in emu/g) of $MnFe(P_{1-x}As_x)$ in the temperature range 0–400 K in a magnetic field of 0.05 T. The "A" after $MnFe(P_{1-x}As_x)$ indicates that the material was first subjected to a heat-treatment (72 hours at 780° C.). The strongest magnetisation for x=0.6 is obtained approximately at room temperature (ca. 298 K). Thus this material produces a good magnetisation at room temperature and at a very small magnetic-field change.

Figure 2:
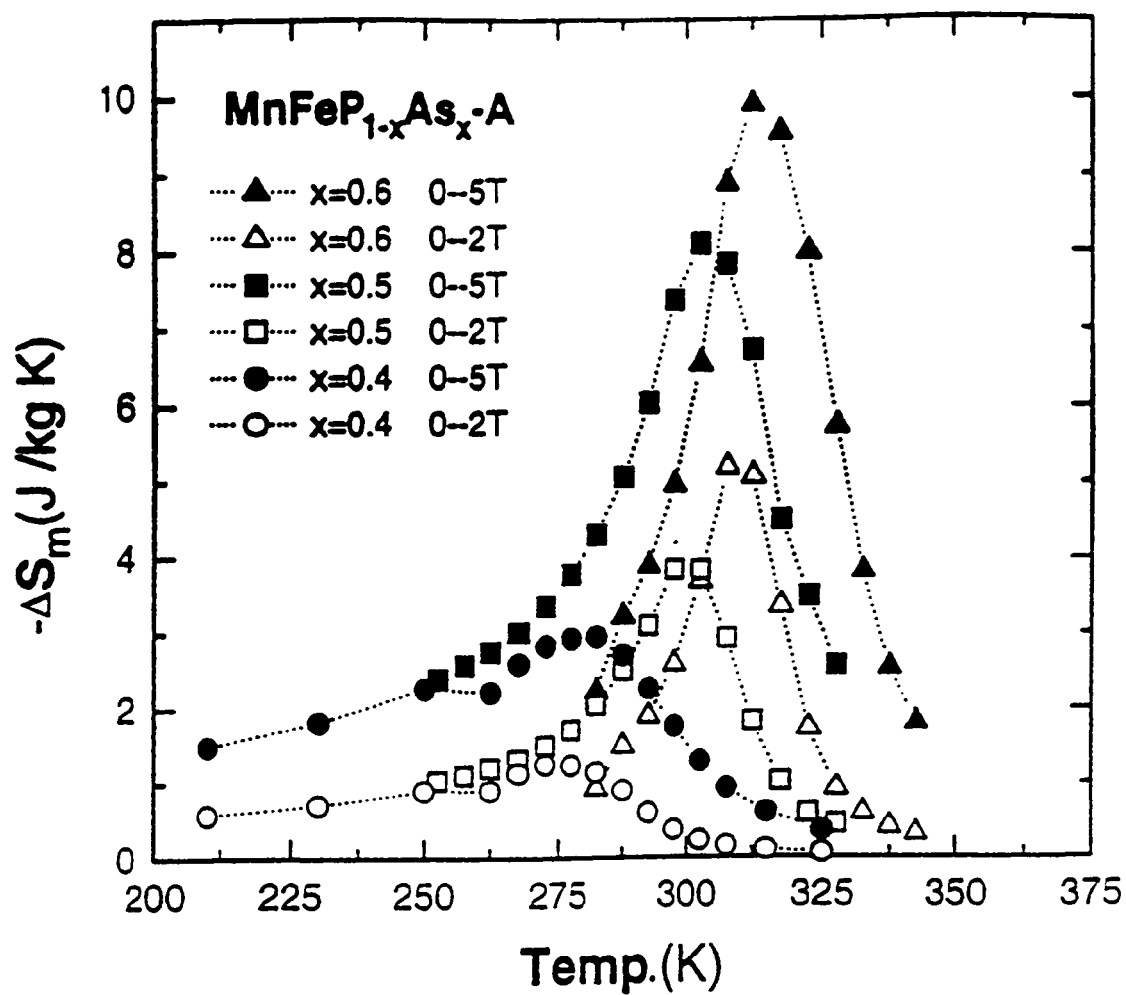

FIG. 2 shows the magnetocaloric effect $\Delta S_m$ of the materials at a magnetic field changes of 0–2 T and 0–5 T. From FIG. 2 can be seen that the materials according to the invention, in particular the material wherein x substantially is approximately 0.6, exhibit a favourable magnetocaloric effect in the temperature range from approximately 250 to 320 K.

Figure 3:
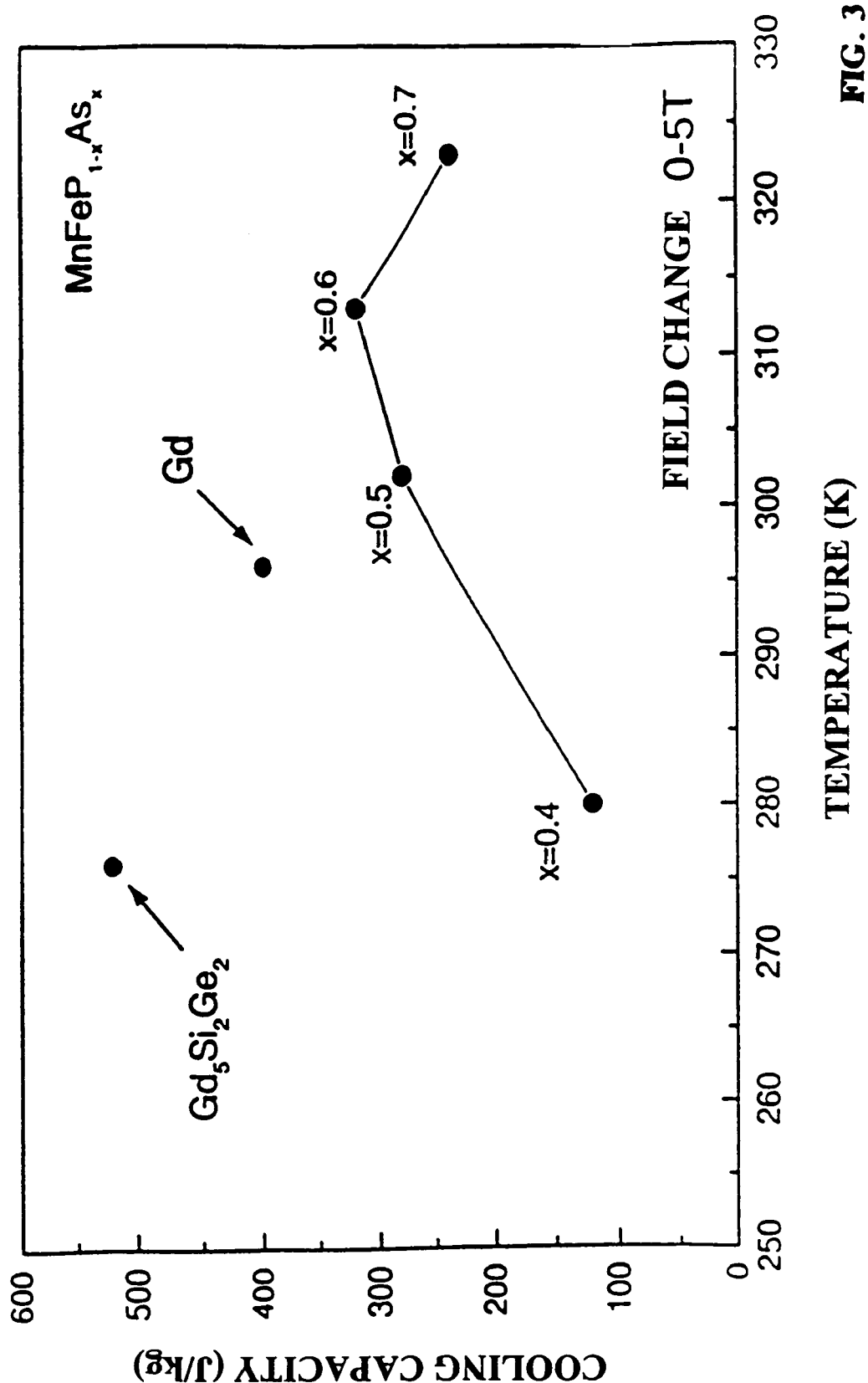

FIG. 3 shows the cooling capacity of some $MnFe(P_{1-x}As_x)$ materials and of the Gd and $Gd_5(Si_2Ge_2)$ materials referred to in the article by Gschneidner Jr. et al., at a field change of 0–5 T. The materials according to the present invention do indeed exhibit a lower cooling capacity than the most effective prior art materials mentioned in the article by Gschneidner Jr. et al., but the maximum cooling capacity of the materials according to the invention lies in a temperature range that is much more useful for application in, for example, an air conditioner or a computer.

EXAMPLE 2

As starting materials $Fe_2P$, $MnAs_2$, Mn and P in the form of powders, were mixed in suitable quantities in a ball mill in order to produce a mixture with the general formula $MnFeP_{0.45}As_{0.55}$. The powder mixture is heated in an ampoule under an argon atmosphere. Heating takes place at a temperature of 1273 K. The alloy is subsequently homogenised at 923 K. The first step of this heat treatment, sintering, takes approximately 5 days, as does the second step, annealing at 923 K. The minimum duration for carrying out the first step is 1 hour, while the minimum duration for the second step is 1 day.

The magnetocaloric effect at room temperature of the alloy obtained by this method is stronger than that obtained when using pure Gd.

A general advantage of the preparation according to this example is, among other things, that there are no weight losses and that the material becomes more homogeneous.

Figure 4:
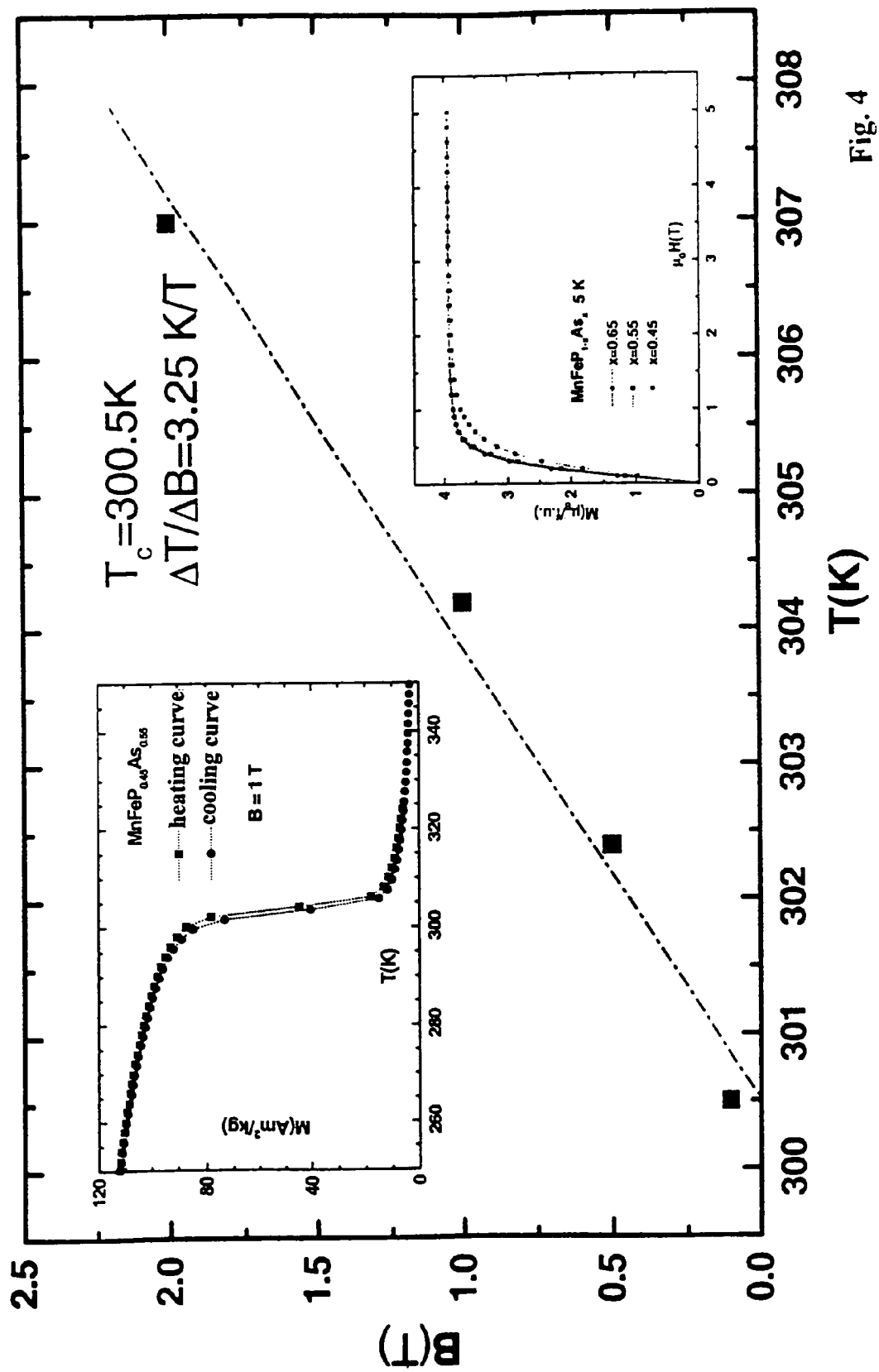

The appended FIGS. 4–7 show the advantages of the alloy according to the invention as prepared in accordance with the above described method. FIG. 4 shows the magnetic transition temperature as function of the applied field.

Figure 5:
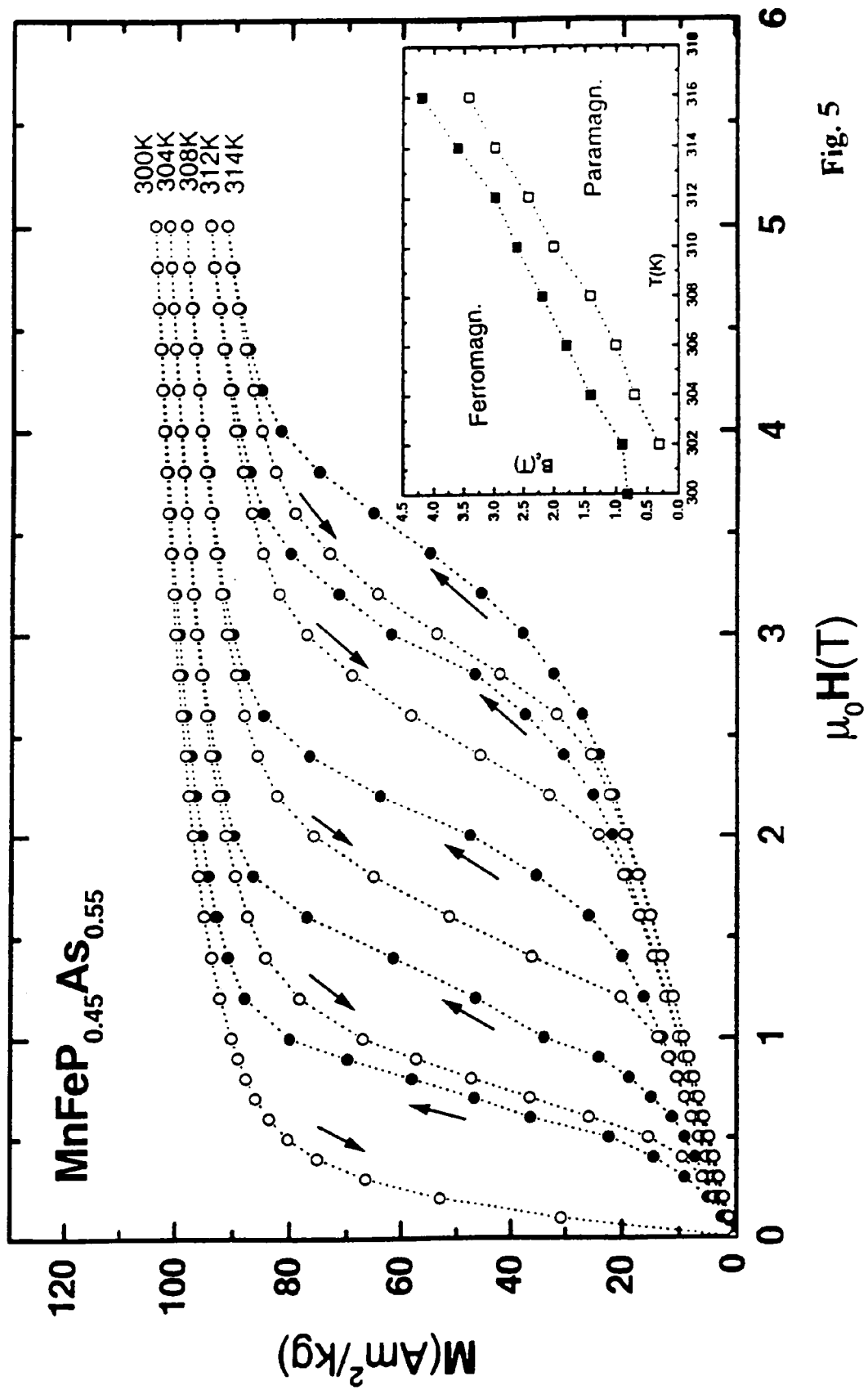

FIG. 5 shows the magnetisation curves at several temperatures around $T_c$.

Figure 6:
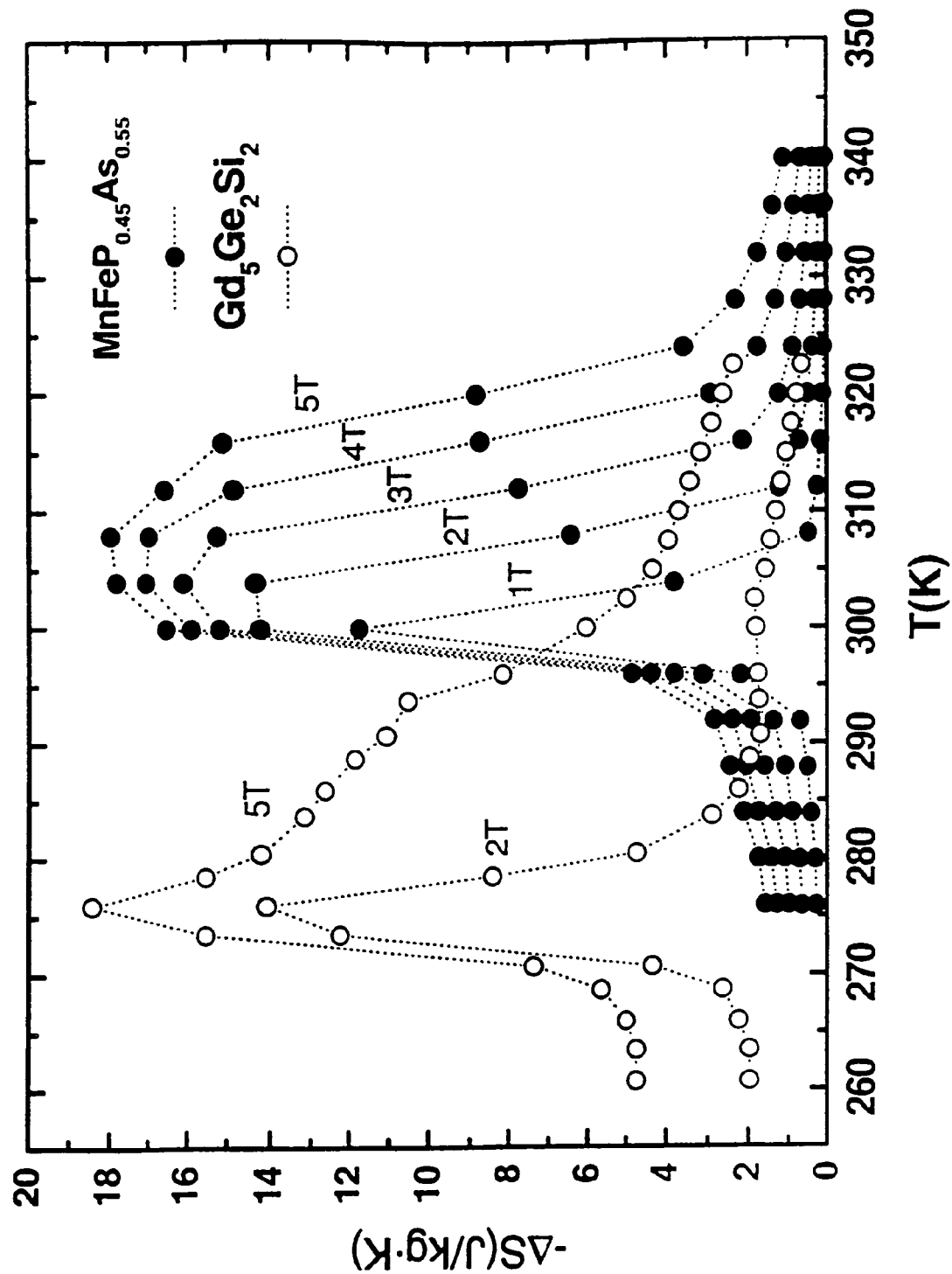

FIG. 6 shows the change of the magnetic entropy for various field changes. For comparison, the values of the change of the magnetic entropy of a prior art material, namely the one according to the article by Gschneidner Jr. et al., is represented. Clearly, at higher temperatures, the material according to the invention provides an excellent effect.

Figure 7:
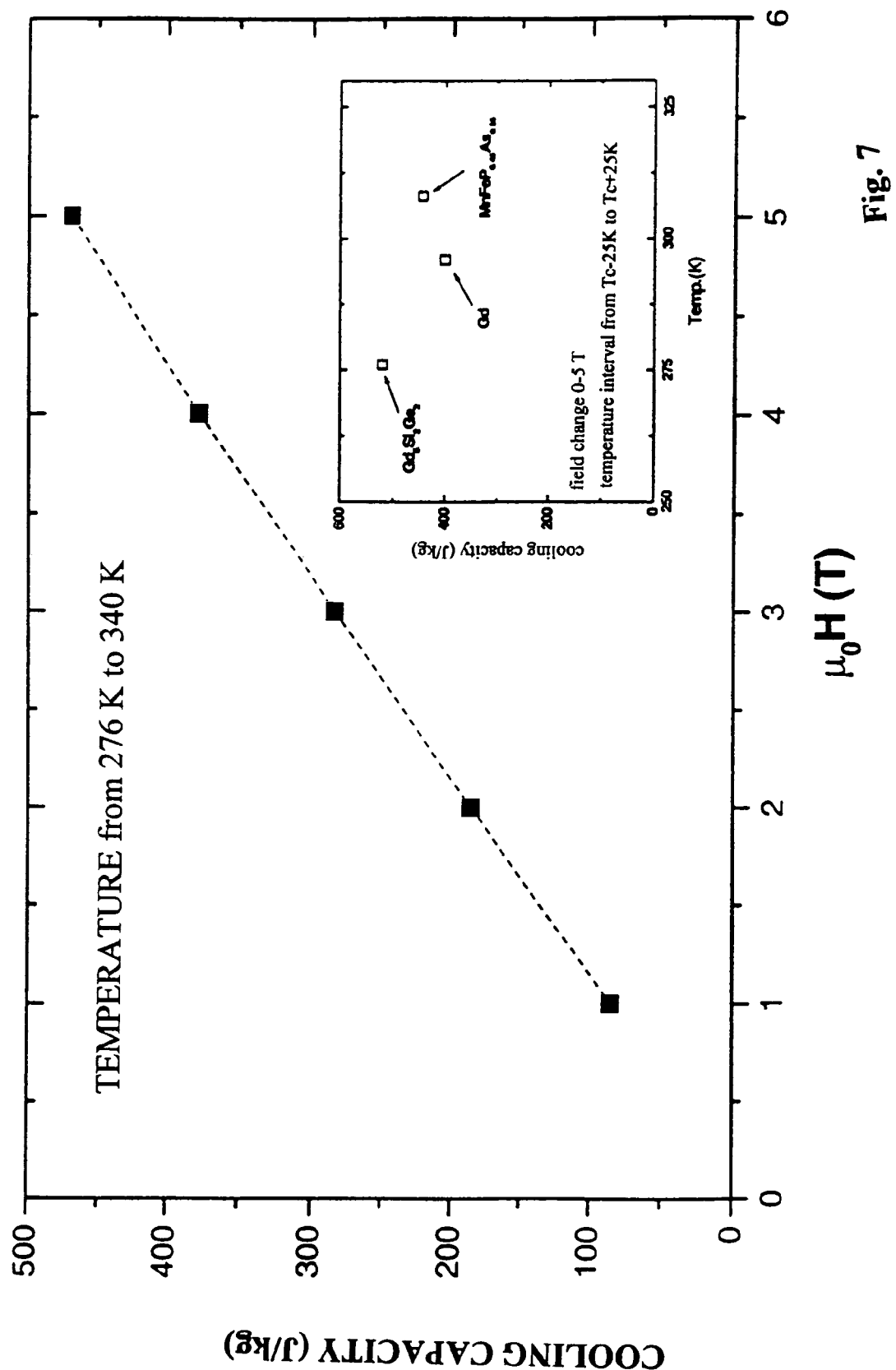

Finally, FIG. 7 shows the cooling capacity for various fields applied to the material. For comparison, the values for the cooling capacity of Gd and the material referred to in the article by Gschneidner Jr. et al. are represented. Here, too, the advantages of the material according to the invention are quite obvious.

The present invention is not limited to the embodiment shown in the figures and described in the exemplary embodiment. More particularly, part of the As may be replaced with Si and/or Ge, as explained in more detail in the specification. They may be varied in numerous ways within the protective scope established by the claims.

What is claimed is:

1. A material that can be used for magnetic refrigeration, wherein the material substantially has the general formula

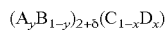

$(A_yB_{1-y})_{2+\delta}(C_{1-x}D_x)$ wherein
A is selected from Mn and Co:
B is selected from Fe and Cr;
C and D are different and are selected from P, As, B, Se, Ge, Si and Sb;
x is a number in the range of greater the 0 and less than 1;
y is a number in the range 0–1; and
δ is a number from (−0.1)–(+0.1).

2. A material according to claim 1, wherein at least 90% of A is Mn; at least 90% of B is Fe; at least 90% of C is P; and at least 90% of D is As or Sb.

3. A material according to claim 2, wherein the material has the general formula $MnFe(P_{1-x}As_x)$.

4. A material according to claim 2, wherein the material has the general formula $MnFe(P_{1-x}Sb_x)$.

5. A material according to claim 1, wherein x is a number in the range from 0.3–0.6.

6. A material according to claim 1, wherein the material substantially has the general formula $MnFeP_{0.45}As_{0.55}$.

7. A material according to claim 1, wherein if D is As, and As is partly replaced with Si and/or Ge.

8. A material according to claim 7, wherein 1–40% of the As is replaced with Si and/or Ge.

9. A method for the manufacture of the material according to claim 3, wherein powders of iron arsenide ($FeAs_2$) or iron antimony ($FeSb_2$); manganese phosphide ($Mn_3P_2$); iron (Fe); and Manganese (Mn) are mixed in suitable quantities to produce a powder mixture that complies with the general formula $MnFe(P_{1-x}As_x)$ or $MnFe(P_{1-x}Sb_x)$ and the powder mixture is subsequently molten under an inert atmosphere and annealed.

10. A method for the manufacture of the material according to claim 1, wherein the same comprises mixing powders of the compounds $Fe_2P$, $MnAs_2$, Mn and P in suitable weight proportions, grinding the powders to produce a powder mixture complying with the general formula $MnFe(P_{1-x}D_x)$, melting the powder mixture in an inert atmosphere, and annealing the resulting alloy.

11. A method according to claim 10, wherein the powder mixture is sintered at a temperature of approximately 1000° C. and the resulting alloy is heated at a temperature of approximately 650° C.

12. A method according to claim 10, wherein the sintering step takes at least approximately one hour and the annealing step takes at least approximately 24 hours.

13. A method according to claim 10, wherein the starting materials are mixed in quantities so as to provide a composition having the formula $MnFeP_{0.45}As_{0.55}$.

14. A method according to claim 10, wherein prior to melting the powder mixture is compressed to a pill.

15. A method according to claim 10, wherein the inert atmosphere is an argon atmosphere.

16. A method according to claim 10, wherein the molten powder mixture is annealed at a temperature in the 750–950° C. range.

17. A method of using the material according to claim 1 comprising employing the material in magnetic refrigeration in the 250–320° K range.

18. A material according to claim 2, wherein at least 95% of A is Mn.

19. A material according to claim 2, wherein at least 95% of B is Fe.

20. A material according to claim 2, wherein at 95% of C is P.

21. A material according to claim 1, wherein at least 95% of D is As or Sb.

22. A material according to claim 8, wherein 10–30% of the As is replaced with Si and/or Ge.

23. A material according to claim 22, wherein 17–23% of the As is replaced with Si and/or Ge.

24. A material according to claim 23, wherein approximately 20% of the As is replaced with Si and/or Ge.

25. A method according to claim 10, wherein D comprises As and Si and/or Ge.

26. A method according to claim 13, wherein the starting materials are mixed in quantities so as to provide a composition having the formula $MnFeP_{0.45}As_{9.45}(Si/Ge)_{0.10}$.

* * * * *

UNITED STATES PATENT AND TRADEMARK OFFICE
CERTIFICATE OF CORRECTION

PATENT NO. : 7,069,729 B2 Page 1 of 1
APPLICATION NO. : 10/769658
DATED : July 4, 2006
INVENTOR(S) : Ekkehard Hubertus Bruck et al.

It is certified that error appears in the above-identified patent and that said Letters Patent is hereby corrected as shown below:

On the title page, item [73] changes in the 3$^{rd}$ Assignee should read

--UNIVERSITEIT VAN AMSTERDAM, FACULTEIT DER NATUURWETENSCHAPPEN WISKUNDE EN INFORMATICA--.

Signed and Sealed this

Twenty-third Day of January, 2007

JON W. DUDAS
*Director of the United States Patent and Trademark Office*